United States Patent [19]

Schroder et al.

[11] 4,409,104

[45] Oct. 11, 1983

[54] METHOD OF REGENERATING MOLECULAR SIEVE MATERIAL

[76] Inventors: Leonard E. Schroder; Leonard D. Schroder, both of Schroder Farms, Campo, Colo. 81029; Billy D. Schroder, deceased, late of Campo, Colo.; by Beverly Schroder, personal representative, Schroder Farms, Campo, Colo. 81029

[21] Appl. No.: 249,164

[22] Filed: Mar. 30, 1981

[51] Int. Cl.³ .............................................. B01J 20/34
[52] U.S. Cl. ..................................... 210/673; 203/41; 210/689; 502/38
[58] Field of Search ...................... 55/33, 75; 210/673, 210/689, 283, 664; 252/411 R; 203/41

[56] References Cited

U.S. PATENT DOCUMENTS

| 1,993,142 | 3/1935 | Johnson | 210/283 |
| 3,398,208 | 8/1968 | Ward | 210/689 |
| 4,130,484 | 12/1978 | Marwil et al. | 210/689 |

OTHER PUBLICATIONS

Hawley, G., *Condensed Chemical Dictionary*, 8th Ed. New York, Van Nostrand Reinhold, 1971, pp. 946–947.

*Primary Examiner*—Ivars C. Cintins
*Attorney, Agent, or Firm*—Horace B. Van Valkenburgh

[57] ABSTRACT

A molecular sieve material for removing water from a liquid, such as distilled alcohol produced from grain, is placed in a series of concentric cylindrical spaces of narrow but equal width and separated by concentric cylindrical passages of lesser width, through which a heated gas, such as air containing the gaseous product of combustion of a fuel, is passed for heating the material for regeneration. After heating, the material is cooled by a gas, such as air, through the same passages. The cylindrical sleeves forming the spaces and passages are relatively thin and the spaces are closed at opposite ends by annular rings to which the sleeves are attached, as by welding, with spacing blocks at spaced points in the passages. Additional rings, of slightly less width than the spaces, are spot welded just inside the end rings to permit flow of liquid but retain the sieve material. The entire structure is preferably upright, enclosed by an insulated housing, and liquid is passed to the bottom and removed from the top of the spaces by headers connected by tubes with the respective spaces, while a water cooled condenser is connected to the outlet. A pipe for conveying heated air from a burner, ahead of a blower, connects with the lower end of the housing, with an outlet pipe at the top for recirculation. A down pipe connects the top and bottom air pipes and is offset above a slide shut-off valve above a flap suction valve which permits outside air to be sucked in for cooling. During cooling, a weighted flap valve on the upper pipe permits discharge of exhaust air.

10 Claims, 19 Drawing Figures

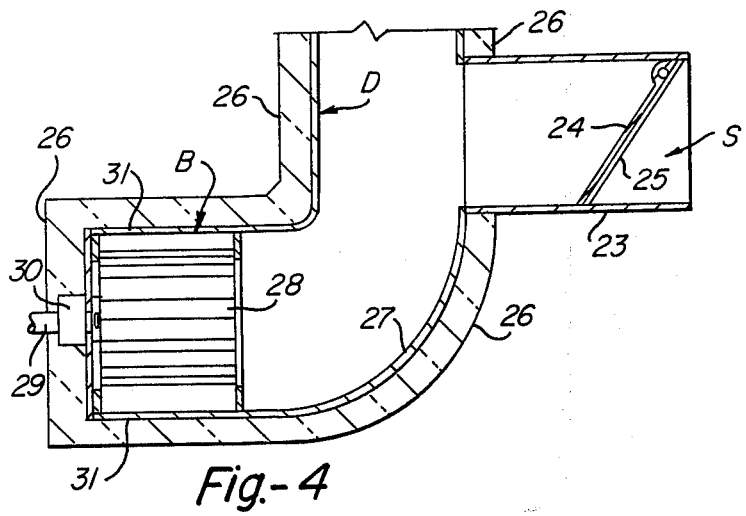
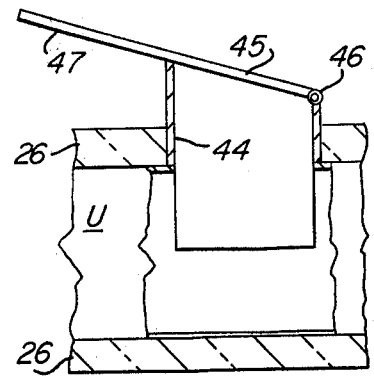
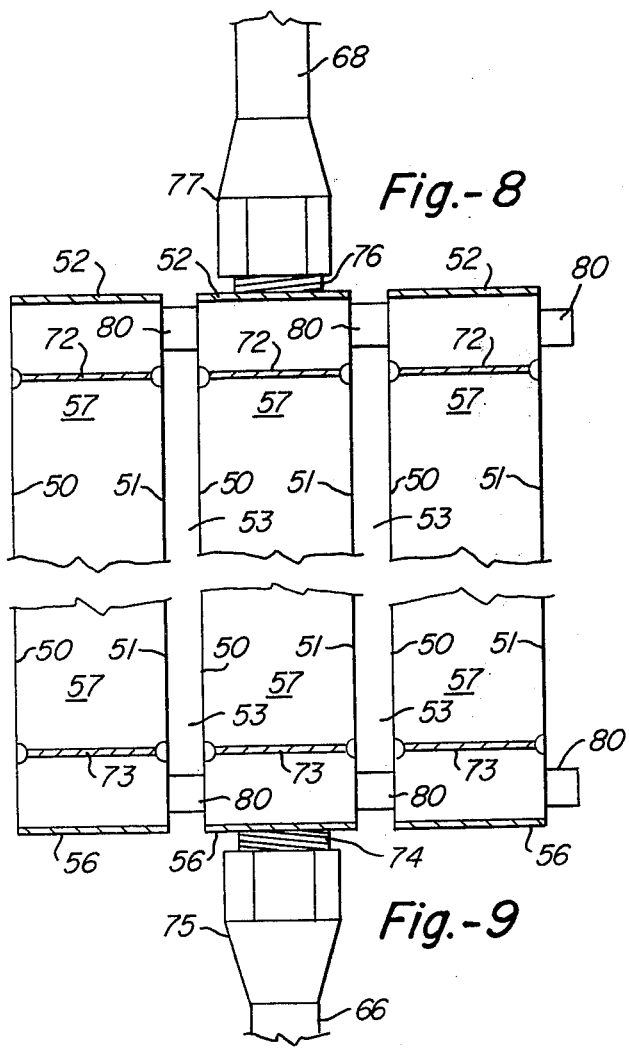
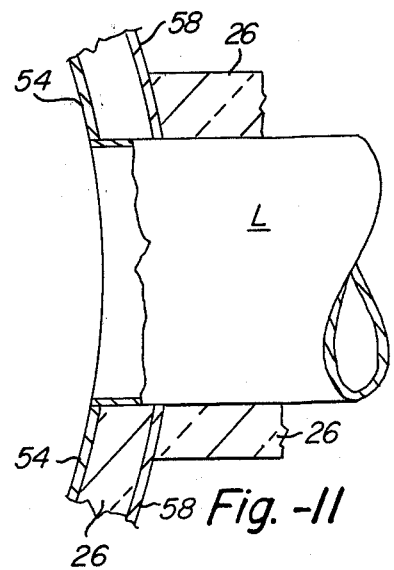

METHOD OF REGENERATING MOLECULAR SIEVE MATERIAL

This invention relates to the regeneration of molecular sieve material and, more particularly, to the regeneration of molecular sieve material which is used to reduce the water content of alcohol, as to increase the proof thereof from 190 to 200.

BACKGROUND OF THE INVENTION

In the production of alcohol from grain for use in making what is termed "Gasohol", a mixture of gasoline and alcohol, it is necessary to reduce the moisture content of alcohol before mixing with gasoline to essentially zero, which is equivalent to a proof of 200, since any water in the alcohol reduces the effectiveness of the gasoline. The alcohol being liquid may be produced by a mash fermented from grain or other suitable materials. In the usual stills which evaporate alcohol produced from mash, the alcohol still contains an undesirable amount of water, the proof thereof normally approaching 190 or 5% water.

A molecular sieve material, such as Type 3A molecular sieve manufactured by Union Carbide Corporation and also by W. R. Grace and Company is particularly useful in removing the moisture or water and producing a 200 proof alcohol. Such molecular sieve material is available in the form of granules and may be placed in a container through which the 190 proof alcohol is passed, so that the molecular sieve material absorbs the water. For a production operation, in which down time is of the essence, the molecular sieve material must be regenerated whenever it becomes essentially saturated with water, and therefore fails to produce the desired proof of alcohol. Such molecular sieve material may be regenerated by heat, but it requires an undue amount of time to heat any substantial size of bed of such material. Thus, the time required for regeneration of a substantial size bed may approach the time during which the bed is operative to produce the desired results. This means that there is no production of the desired alcohol for approximately 50% of the time.

It has been proposed to revivify carbonaceous absorbents such as bone char, as in U.S. Pat. No. 2,851,428 by passing the char downwardly through parallel tubes surrounded by a heating medium, preferably heated gases. Also, U.S. Pat. No. 2,222,304 discloses a method and apparatus for catalytic reaction in which the catalytic reaction is controlled by circulating a temperature controlled heat exchange medium in heat exchange relationship with the material in a contact bed which has a relatively greater length in proportion to its transverse dimension by passing the heat exchange medium through tubes provided with outwardly extending fins or plates. However, the distance between the tubes is much greater than would permit an adequate and sufficiently fast transfer of heat for regeneration of a molecular sieve material. Of course, the catalyst, itself, is regenerated by passing in an oxidizing medium through the bed, while maintaining circulation of the heat transfer medium. Neither of the foregoing appear to suggest a satisfactory solution to the problem of producing a fast enough heating of a molecular sieve material for regeneration thereof, accompanied by a relatively fast cooling thereof to place the material at the temperature suitable for further extraction of water or moisture from alcohol. Since the removal of water or moisture from alcohol by a molecular sieve material is exothermic and the material tends to become heated during reaction, it is necessary that the molecular sieve material be returned to a lower temperature, such as 200° F., prior to initiating further removal of moisture.

SUMMARY OF THE INVENTION

In accordance with this invention, a molecular sieve material adapted for the removal of moisture or water from alcohol is placed in a series of concentric circular spaces of narrow width and, more particularly, a width which is essentially merely a fraction of the circumference. Between each such space for containing a molecular sieve material is a passage which may have a considerably less thickness than the aforesaid space through which heated air is passed for regeneration of the molecular sieve material. The air passages are concentric and circular, while both the molecular sieve spaces and air passages should have as uniform a width as possible, completely around the peripherty thereof. Any flow of the liquid, such as alcohol, from the spaces containing the molecular sieve material into the heated air passages is prevented and, similarly, any flow of air from the air passages to the molecular sieve spaces is prevented. In further accordance with this invention, the imperforate walls or shells forming the circular spaces and annular air passages are comparatively thin so as to increase the rate of heat transmission from the heated air to the molecular sieve material.

The assembly of concentric enclosed spaces is installed in a vertical position within a tower for passage of the heated air and later cooled air through the passages from a bottom air reception space to an upper air discharge space to provide the desired high temperature such as 500° F. or above. The air is recirculated without the introduction of fresh air except at a burner, to which fuel and air are supplied, the latter being a blower with the products of combustion being completely discharged into the air stream which moves from a blower through a pipe to the lower end of the tower from the upper end of the tower. The air cooled somewhat by passage through the tower passes downwardly to the inlet of the blower and past the burner to pick up additional hot products of combustion. When the regeneration is complete, indicated by the fact that water vapor is no longer driven off from the molecular sieve material, the burner is turned off and air is no longer recirculated, but rather fresh air is supplied to the blower by blocking off the recirculation pipe just prior to the blower and permitting fresh air to be drawn in by a special valve, with the cool, outside air being forced by the blower through the passages in the tower and discharged from the upper pipe through a flap valve which is responsive to a pressure which exceeds the normal recirculating pressure. The normal recirculating pressure is comparatively low because the discharge space in the tower is connected with the suction side of the blower. The termination of recirculation for cooling is accomplished by a slide valve in the down pipe just above the blower.

A condenser is provided for condensing any alcohol vaporized by exothermic reaction of moisture and water removal. The condenser is also utilized in condensing water vapor driven off the molecular sieve material during regeneration.

The spaces for containing the molecular sieve material are formed by thin-walled shells extending longitudinally in narrow space relation and attached as by welding to each other and to an annular ring. In addition, special provision is made for maintaining the relationship of the shell assemblies, as well as for accomodating expansion and contraction of tubes which connect a lower alcohol inlet header with the bottom of the aforesaid rings and an upper alcohol outlet which is connected with the respective top rings. The entire tower is insulated, as well as the pipe through which the heated air and gases are recirculated.

THE DRAWINGS

FIG. 4 is a limited vertical section taken along line 4—4 of FIG. 3 and showing particularly a blower and a suction flap valve.

FIG. 5 is a limited vertical section, on an enlarged scale, showing a flap valve installed on an upper pipe.

FIG. 8 is an enlarged fragmentary detail of an upper portion of the column and connections to the sections thereof.

FIG. 9 is a similar enlarged fragmentary detail showing a lower portion of the column and connections to the sections thereof.

FIG. 10 is a fragmentary horizontal section, on an enlarged scale and taken along line 10—10 of FIG. 1, showing particularly an upper pipe connection to the column.

FIG. 11 is a similar fragmentary horizontal section, on an enlarged scale and taken along line 11—11 of FIG. 1, showing particularly a lower pipe connection to the column.

DESCRIPTION OF THE PREFERRED EMBODIMENT

Figure 1:
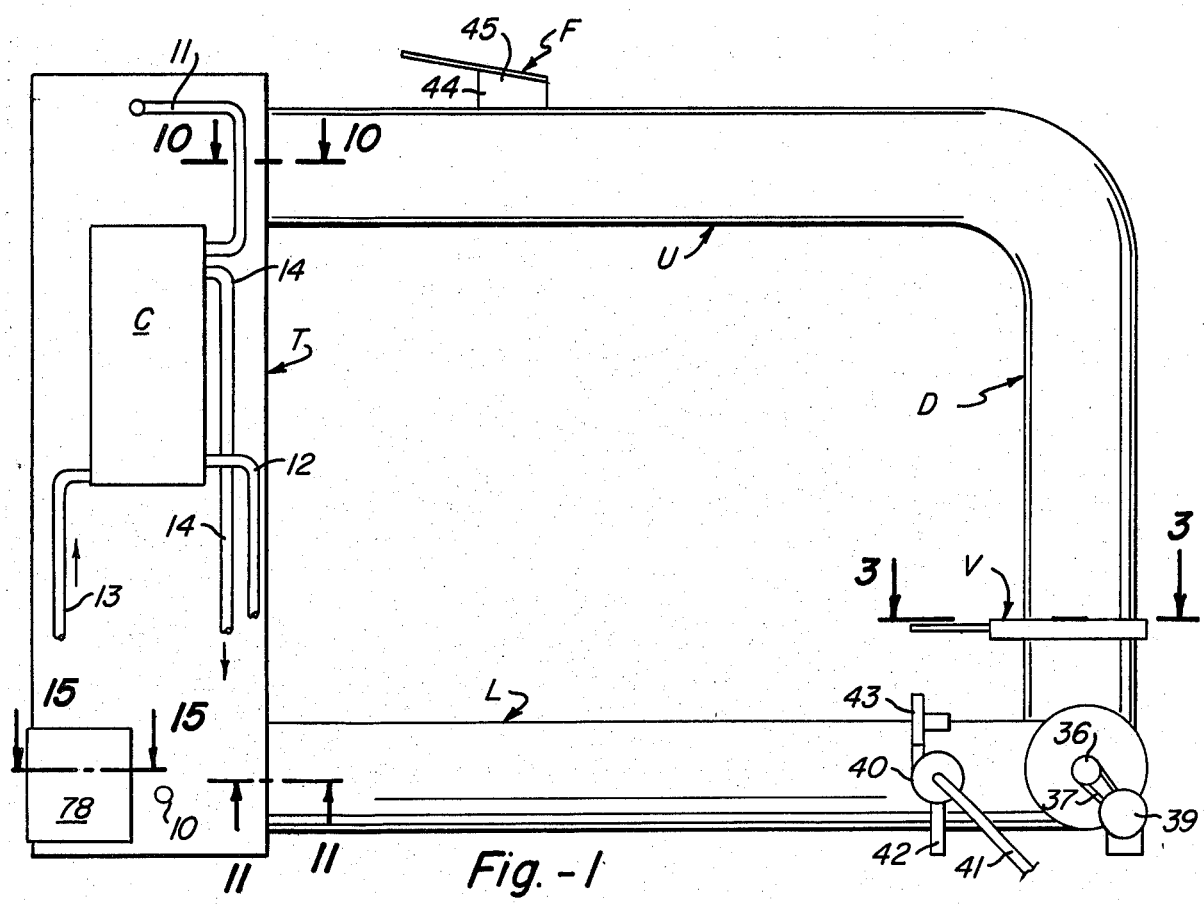
FIG. 1 is a front elevation of apparatus adapted to carry out the method of this invention

In FIG. 1 is shown an apparatus adapted to carry out the method of this invention, including an insulated tower T, within the interior of which is a column especially constructed in accordance with this invention which permits the removal of water or moisture from a relatively high-proof alcohol by a molecular sieve material, the regeneration of which is accomplished in accordance with this invention, when the molecular sieve material becomes saturated with water. As indicated previously, the molecular sieve material may be selectively absorbent of water or water vapor, but requires regeneration periodically, through heating. The 190 proof alcohol may be produced by a conventional plant which includes a mill for grinding the grain, a cooker to which hot water is supplied by a boiler, a saccharification tank, a pluality of fermentation tanks, a still for concentrating the alcohol liquid produced and feed tanks for storing the 190 proof alcohol.

Figure 2:
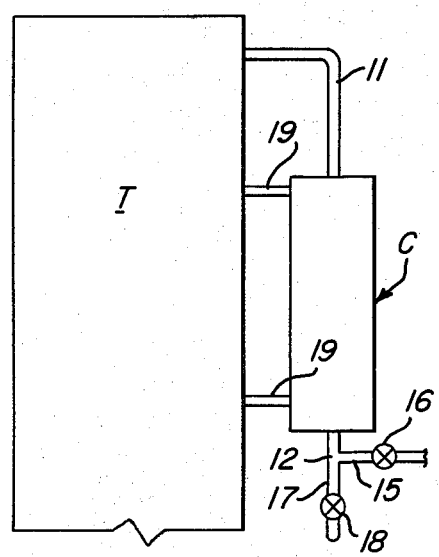
FIG. 2 is a partial end elevation showing particularly a condenser.

In the present instance, heating is accomplished by circulating heated gas through special annular passages interspersed with enclosed, annular sections in which the molecular sieve material is contained, and the construction of which will be described in greater detail later. The alcohol, such as 190 proof or containing only 5% moisture, enters the tower through a bottom inlet pipe 10, and is discharged through an upper oulet pipe 11, for passage through a condenser C, of conventional construction, which is desirable during absorption because the reaction between the moisture in the alcohol and the molecular sieve material is exothermic and tends to heat the alcohol, but is also necessary during regeneration. Thus, any alcohol vapors produced during adsorption by the molecular sieve material is condensed to liquid in the condenser C. The alcohol, including the alcohol vapors condensed, are discharged from the condenser through a pipe 12 at the lower end so that the alcohol and cooling liquid, normally water, will pass in counter-current relation through the condenser. Thus, water is introduced through a lower inlet pipe 13 and discharged through an upper outlet pipe 14. The alcohol outlet pipe 12, as in FIG. 2, is provided with a branch 15 having a valve 16 interposed therein, for normal flow of alcohol to a collection tank, in a conventional manner. Another branch 17, having a valve 18, is utilized for the passage of alcohol from which the water vapor has not been completely stripped to water containing little alcohol. When the proof exceeds 190, such higher proof alcohol may be stored in another tank and rerun through the molecular sieve material after the next regeneration. Or, lower proof alcohol may be returned to the mash tanks, while water condensate having little or no alcohol may be drained to a sewer. Thus, by closing valve 18 and opening valve 16, the normal flow of essentially 200 proof alcohol to the collection tanks therefor may be obtained, while by closing valve 16 and opening valve 18, a flow of high-proof alcohol to a collection tank may be obtained or other disposition of the condensate may be made. Condenser C is mounted on tower T by brackets 19 of FIG. 2.

When the molecular sieve material requires regeneration, the alcohol remaining in the spaces containing material may be first drained, as through inlet pipe 10, and returned to the 190 proof feed tanks in a manner described later.

When regeneration is first started, alcohol vapors, having a lower boiling point than water, will tend to be driven off the molecular sieve material first, for passage through the condenser and this condensate is diverted through branch 17 to the collection tanks for higher proof alcohol. However, as soon as the vapors driven off from the molecular sieve material begin to contain substantial water vapor, the condensate may be passed through the branch 17 for purposes described above.

The apparatus of FIG. 1, for regeneration purposes, includes an insulated lower pipe L through which air, heated by a heater H and including the products of combustion of the heater, is circulated by a blower B for passage upwardly through the column containing molecular sieve material within the tower T. The cooler gases exhaust from the tower through an insulated upper pipe U having a flap valve F which is in use only when cool air is being blown through the tower for cooling the heated molecular sieve material, after regeneration. From the upper pipe U, air circulates through an insulated down pipe D past a slide valve V, which is also used only during cooling after regeneration, and then past a suction valve S of FIGS. 3 and 4, again utilized only during cooling. The gases then return to the blower B and move past the heater H for reheating, picking up additional products of combustion of the heater. During such recirculation of heated air, the air may approach a temperature of 500° F. to 600° F., which results in a relatively fast regeneration, thereby reducing considerably the downtime during which no alcohol can be purified.

Due to the heat required for fast regeneration, the molecular sieve material is at a temperature which is greatly above the boiling point of alcohol and must be cooled before the purification process can begin again. For cooling, the slide valve V in the down pipe D is closed, to preclude recirculation of air. The heater H is turned off, but the blower B is operated at full speed so that cool, outside air is sucked in through the suction valve S and passes through the special passages provided by this invention to cool the molecular sieve material, and is exhausted to the atmosphere through the flap valve F on the upper pipe U, since recirculation is precluded by the closed slide valve V. It should be emphasized that neither the heated air for regeneration or the cooler air for cooling ever contacts the molecular sieve material, so that the relative humidity of the outside air cannot be a problem.

Figure 3:
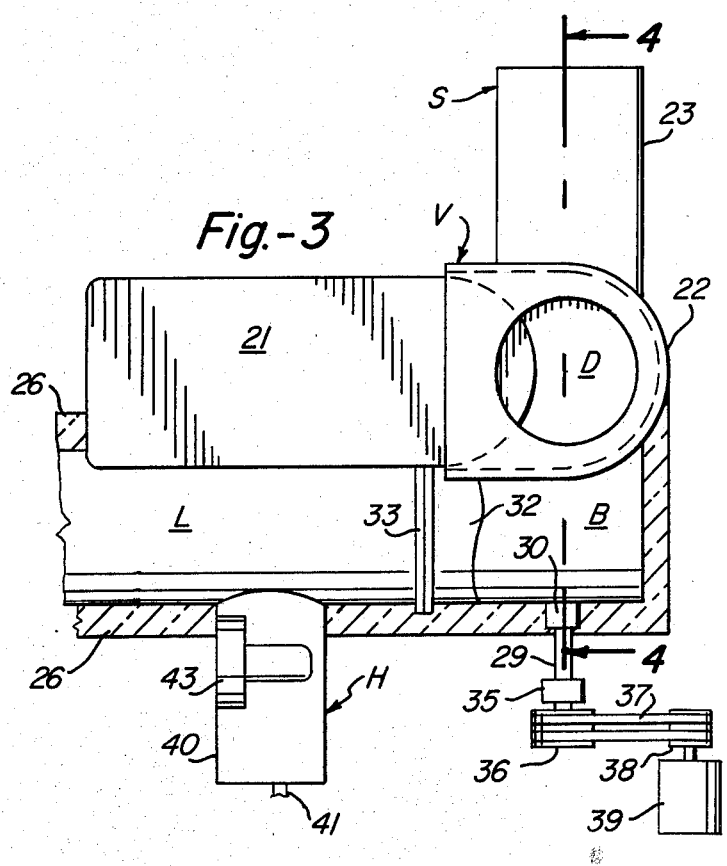
FIG. 3 is a limited horizontal section taken along line 3—3 of FIG. 1, on an enlarged scale, with lower insulation broken away to show a pipe and details of other parts.

As in FIGS. 3 and 4, the slide valve V may include a slide plate 21, which is guided by a channeled housing 22, to and from positions opening or closing off the passage through the down pipe D. The suction valve S is disposed within a rectangular housing 23, open at both ends, with the outer end being open to the atmosphere and the inner end extending to the down pipe D. The suction valve is provided with a pivoted plate 24 which normally rests against an inclined guide bar 25 at each side, but when sufficient suction is produced by the blower B, will raise to permit outside air to be drawn into the blower B through an elbow 27. Each of the upper and lower pipes, as well as the down pipe, are provided with insulation 26, as is also the tower T. The insulated blower B may include a squirrel cage impeller 28 having inclined vanes disposed in a ring as shown, and supported and driven by a shaft 29 in overhanging relation to, but closely adjacent to a bearing 30. The blower impeller is disposed within a housing 31, appropriately constructed to permit an axial intake and a tangential discharge into a duct 32 connected to lower pipe L at a conventional flanged joint 33. Outside the insulation 26, as in FIG. 3, shaft 29 extends through a second bearing 35 to a pulley 26 connected by V-belts 37 with a pulley 38 of a drive motor 39.

The heater H is provided with a conventional burner 40, supplied with an appropriate fuel, such as a liquid or gaseous hydrocarbon, through pipe 41 and is supported by a pedestal 42 of FIG. 1. A motor driven blower 43 is mounted on the burner in a position to discharge air tangentally into the burner to produce a spiral effect and increase the combustion of fuel in order to provide products of combustion having as high a temperature as possible. As indicated previously, the gaseous products of combustion discharge from the burner 40 into the lower pipe L and are carried along with the recirculated air.

As in FIG. 5, the flap valve F extends through the insulation 26 on the upper pipe U, having a rectangular housing 44, the upper end of which is cut off at an angle so that a flat plate 45 may be pivoted at the lower edge of the upper end of the housing 44, as by pin 46. The flap plate 45 will normally remain in engagement with the upper edges of the housing 44 until the pressure inside the upper pipe becomes sufficient to lift the flap plate. An upwardly inclined stem 47 of the flap plate 45 may be narrower than the remainder thereof, but adds sufficient additional weight.

Figure 12:
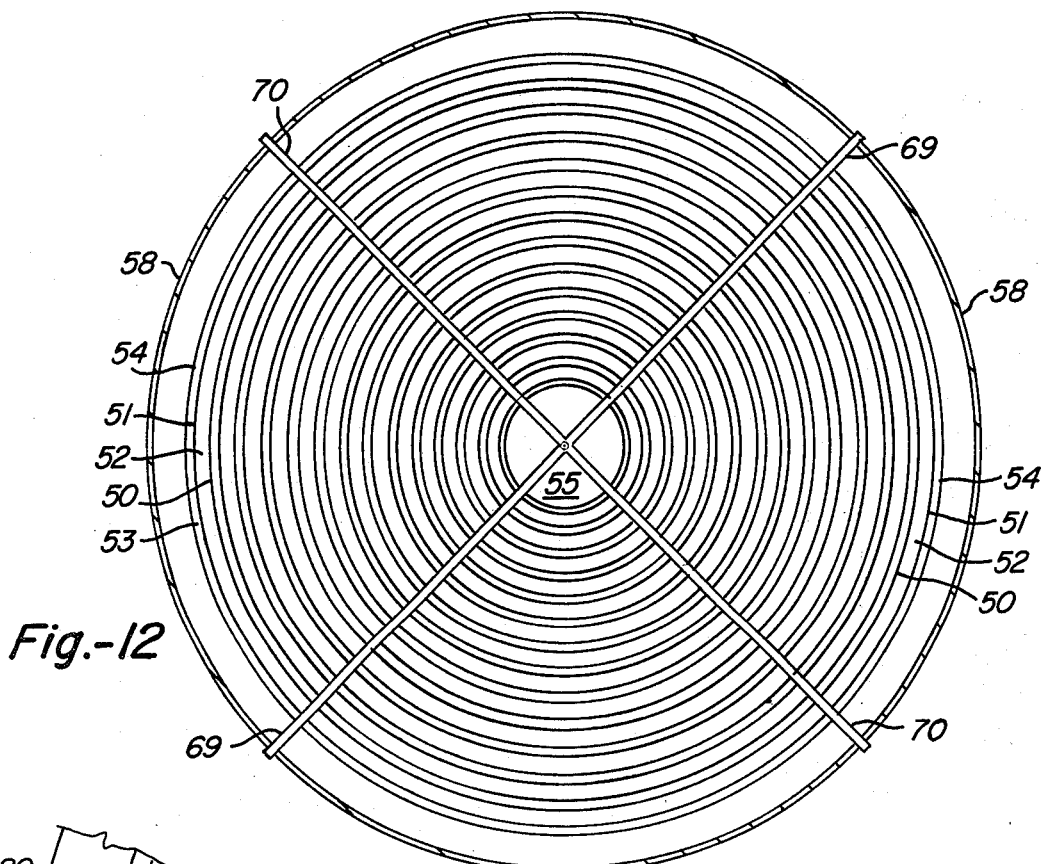
FIG. 12 is a bottom plan view of the column with connections omitted, but showing particularly supporting bars for the column.

The hollow spaces containing the molecular sieve material are circular and the sections which provide the spaces are interspaced with the circular hollow passages through which air is blown for regeneration or subsequent cooling of the molecular sieve material. As in FIGS. 6 and 7, an inner circular sleeve 49 is spaced relatively close, such as $\frac{1}{4}''$, to a cylindrical section formed by a pair of thin-walled, upright circular sleeves 50 and 51, which are joined at the top to an annular ring 52. Inner sleeve 49 and sleeve 50 form an air passage 53, while the outside sleeve 51 and the inside sleeve of the next section form a similar air passage of greater diameter. Similar air passages, of the same width but successively increasing diameters, are formed between successive sections, while a thin-walled outer sleeve 54 forms an air passage 53 with the out side of the outermost section. The hollow center within inner sleeve 49 is closed off at each end by a disc 55 of FIGS. 7 and 12. As in FIGS. 8 and 9, not only are the thin-walled sleeves 50 and 51 attached to an annular ring 52 at the top, but also to an annular ring 56 at the bottom, to provide an enclosed space 57 for receiving the molecular sieve material, such as indicated previously. Space 57 is wider than air passage 53, such as 1", in order to provide considerably greater cross-sectional area for reception of the molecular sieve material, but still provide passages through which air may be blown and permit transfer of sufficient heat to or from the molecular sieve material. Outwardly of the outermost sleeve 54 of relatively thin material is an outer wall 58 which is considerably heavier and provides stability for the tower T. For instance, the sleeves forming the air passages and the spaces for the reception of molecular sieve material, may be formed of 12 gauge material, while the outer wall 58 may be one-fourth inch thick. Outer sleeve 54 may be thicker than the remainder of the sleeves since, as in FIG. 7, it extends downwardly to the bottom of the tower and upwardly to the top of the tower, to hold insulation between it and outer wall 58.

Figure 7:
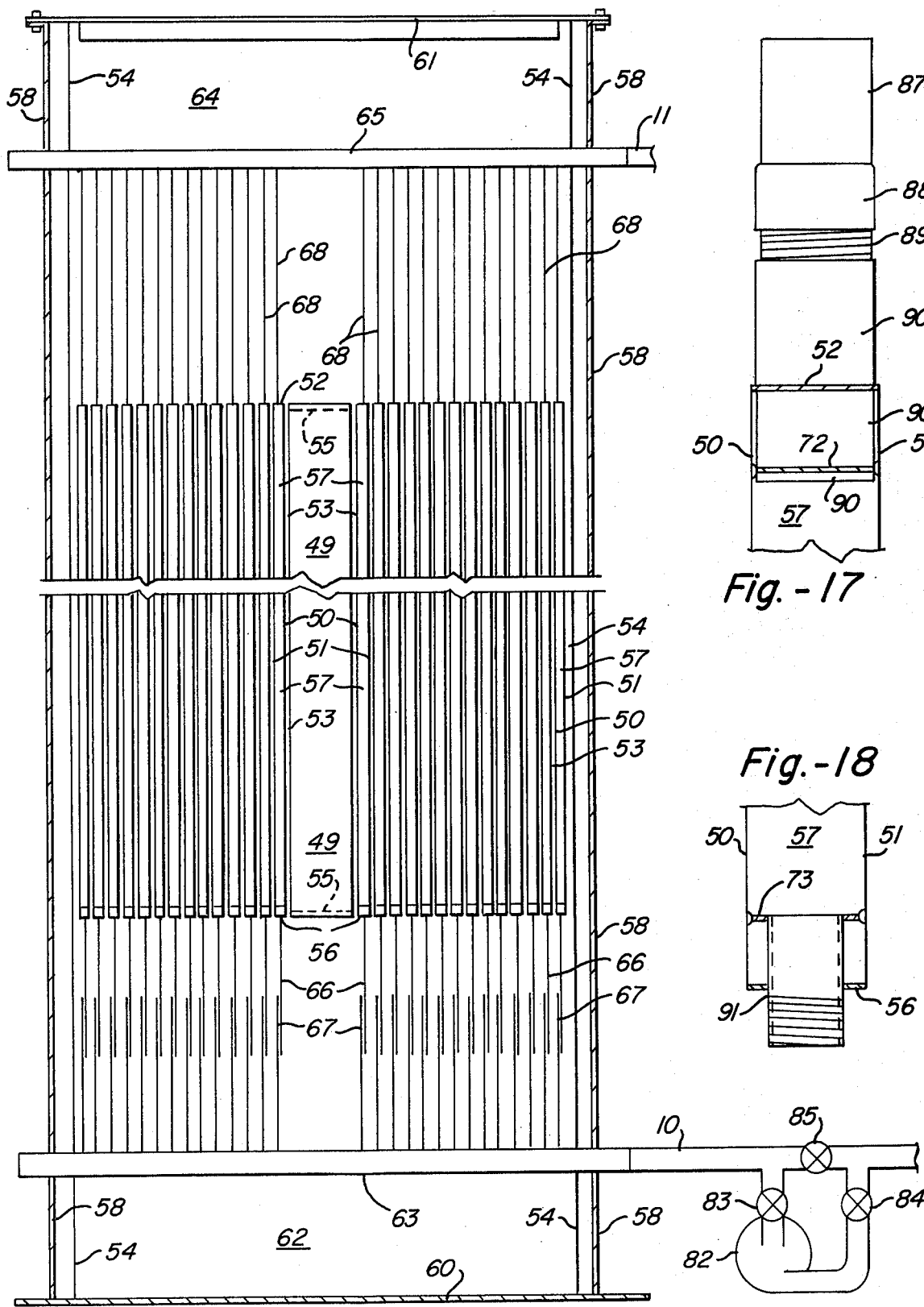
FIG. 7 is a partially diagrammatic, condensed vertical section, on a slightly reduced scale and taken along line 7—7 of FIG. 6, showing also an insulating covering of the column.

As also illustrated in FIG. 7, cylindrical outer wall 58 extends downward to a base plate 60, to which it may be welded and upwardly to a top plate 61, which may be removably attached to wall 58 in a conventional manner, as by being bolted to an outwardly extending flange of the wall, as shown. Below the column forming the air passages and spaces for sieve material and above base plate 60, is a lower space 62, with which lower pipe L connects and which provides sufficient space for making connections or repairs to an alcohol inlet manifold 63, which connects with inlet pipe 10. Air is exhausted from the air passages through a similar upper space 64 with which upper upper pipe U connects, and through which extends an outlet or upper manifold 65, which is connected to outlet pipe 11. Each manifold 63 and 65 extends at each end through the outer wall 58, both for greater stability and also to permit the respective inlet or outlet pipe to be connected to either end of the corresponding maifold. Manifolds 63 and 65 are preferably square or rectangular to enable the lower tubes 66 and upper tubes 68 to be attached in staggered relation thereto and also to permit them to extend through a corresponding hole in outer wall 58, the better to resist twisting.

As in FIGS. 10 and 11, the angular relation of lower pipe L and upper pipe U to the tower T are different. The lower pipe L is aligned with the center of the tower, as in FIG. 11, while the upper pipe U extends in an angular relation to approximately the position of flap valve F, then parallel to the lower pipe L, in order to offset the down pipe D from the lower pipe and thereby permit an axial intake of the blower B. Each pipe L and U extends through a hole in outer wall 58 and to a hole in outer sleeve 54.

As in FIG. 7, a series of tubes 66 connect the lower manifold header 63 with the lower rings 56 of the sections for containing molecular sieve material, each tube having an expansion loop 67, to prevent loosening of any connection during the temperature range produced by the hot air during heating, and perhaps very cold air during cooling, blown through the lower space 62. A series of similar upper tubes 68 connect the upper manifold 65 with rings 52 at the upper ends of the spaces for molecular sieve material. Tubes 68 may be similarly provided with loops 67, although the variations in temperature tend not to be extreme in the upper space 64 as in the lower space 62. Special connections are preferably utilized at each end of lower tubes 66 and upper tubes 68, as will be described later. The entire column providing the annular passages for air and the larger annular spaces for the sieve material may be supported by a pair of bars 70 and 71 of FIG. 12, which extend beneath the assembly and through the heavier outer wall 48, being welded to the outer wall on the outside as shown.

Figures 6, 19:
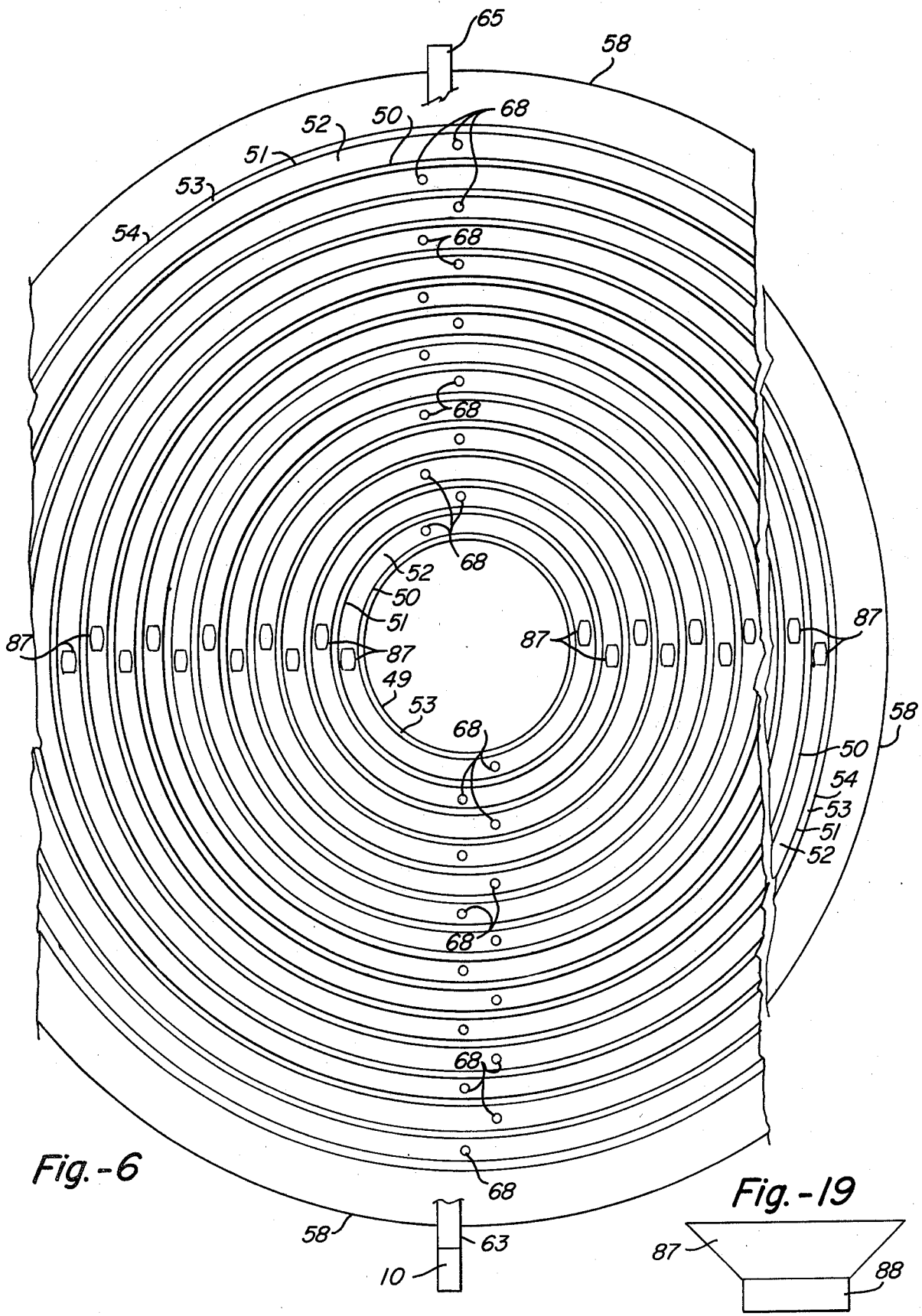
FIG. 6 is a condensed top plan view of a column assembly with a top manifold shown fragmentarily and connections omitted.
FIG. 19 is a side elevation on a reduced scale of a filling device, similar to a funnel, forming part of the filling connection of FIG. 17.

As in FIG. 6, the upper tubes 68 and similarly, the lower tubes 66, extend in staggered relation downwardly from the outlet manifold 65 and upwardly from the inlet manifold, respectively, in order to provide greater access to the connections at the ends of the tubes. Appropriate connections between the upper and lower tubes to the respective molecular sieve spaces are shown in FIGS. 8 and 9. The thin gauge material of the sleeves 50 and 51 are welded at the upper ends to the corresponding annular ring 52 and at the lower end to annular ring 56. However, prior thereto, an upper ring 72 and a lower ring 73, each smaller in width than the distance between sleeves 50 and 51, is positioned inside the respective sleeves a short distance from the upper and lower ends, respectively. Each ring 72 and 73 is spot welded, as at positions a short distance apart circumferentially, to the sleeves 50 and 51, to provide passage for the alcohol and other vapors through the molecular sieve spaces, but prevent the molecular sieve material from dropping into the lower header or being carried out at the top by the alcohol flowing through.

At an appropriate position, each lower annular ring 56 is provided with a threaded nipple 74 at each side for engagement by a fitting 75 and at the upper end each annular ring 52 is provided with a threaded nipple 76 at each side which is connectable to and disconnectable from the upper tube 68 by a tube fitting 77.

Figure 15:
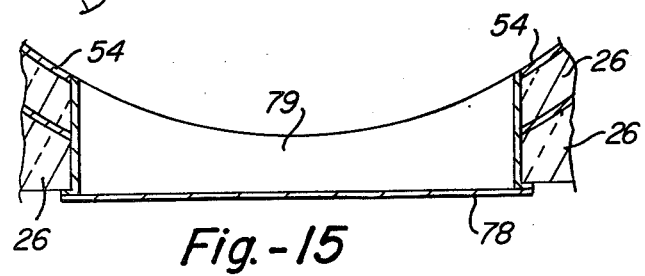
FIG. 15 is a fragmentary horizontal section, on an enlarged scale and taken along line 15—15 of FIG. 1, showing particularly an access port for the base of the column.
Figure 16:
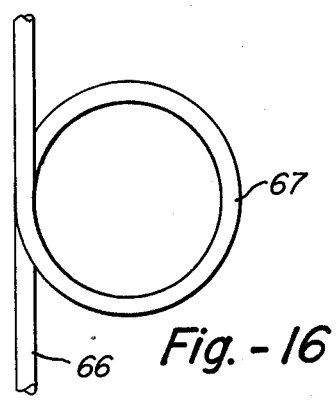
FIG. 16 is a side elevation, on an enlarged scale, of a stress relief loop shown diagrammatically in FIG. 7 of the tube connections for the base of the column.

The manifolds 63 and 65 are similarly provided with threaded nipples for connection of the respective ends of the tubes thereto, it being understood that the position of these nipples is staggered, such as corresponding to the indication of the position of the tubes 68 in FIG. 6. For gaining access to the upper header and the connections associated with the tubes 68, the top plate 61 may be removed. For gaining access to the lower header and the connections associated with the lower tubes 66, a cover 78 of FIG. 15 may be removed from an insulated manhole 79 which extends through both outer wall 58 and outer sleeve 54.

Figure 13:
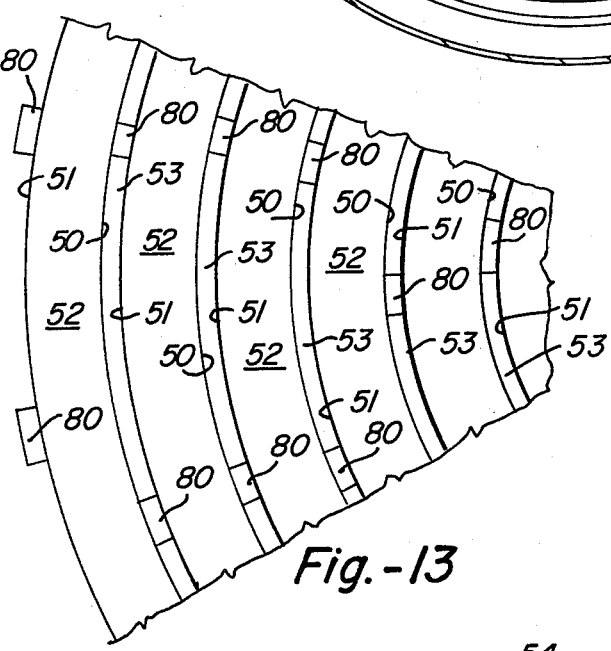
FIG. 13 is a fragmentary top plan view, on an enlarged scale, showing a portion of the top of the column and also showing spacers between upright sections.
Figure 14:
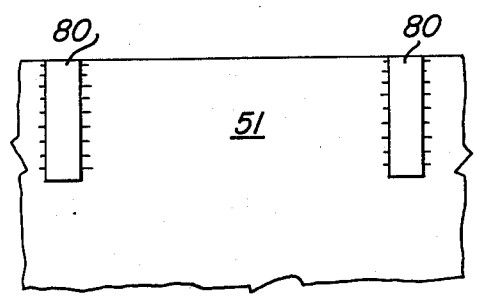
FIG. 14 is a side elevation looking toward the outside of the column sections shown in FIG. 13 and also showing the spacers.

In order to mount the thin-walled annular sections forming the spaces for the molecular sieve material in position with respect to each other and more particularly, to maintain the width of the smaller air passages uniform, a series of spacing blocks 80 of FIGS. 13 and 14, may be utilized. The spacing blocks 80 shown also in FIGS. 8 and 9, are spot-welded to the outside of sleeve 51 of the respective section at spaced positions, such as about 6" apart and around both the upper and lower periphery of each section. The spacing blocks 80 are slightly curved to correspond to the contour of the outer sleeve 51 to which the respective block is attached, and also to the inner sleeve 50 of the next outer section, which abuts the spacing block, as in FIG. 13. The thickness of the spacing blocks correspond to the thickness of the air passages 53, while the width of the blocks is preferably a multiple of the thickness and the length of the blocks is preferably a multiple of the width.

When circulation of alcohol is stopped because the molecular sieve material requires regeneration, there will be 190 proof alcohol in the sieve material, which can be returned to the storage tanks therefor. For this purpose, a pump 82, as in FIG. 7, may have an inlet provided with a normally closed valve 83 and an outlet provided with a normally closed valve 84 connected to inlet pipe 10 on opposite sides of a normally open valve 85 in pipe 10. By closing valve 85 and opening valves 83 and 84, then starting pump 82, the alcohol in the column may be returned to the 190 proof tanks before regeneration begins.

Figure 17:
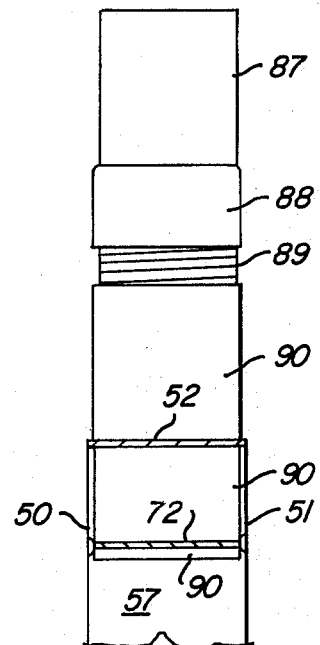
FIG. 17 is an enlarged sectional detail showing a filling connection at the top of a section of the column.
Figure 18:
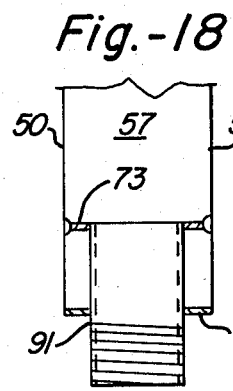
FIG. 18 is a similar detail in longitudinal section, showing a discharge connection at the bottom of a section of the column.

For filling the respective spaces with the molecular sieve material, a series of filling connections spaced outwardly from each side of center as in FIG. 6, and in staggered relation similar to the tubes 68, may be utilized for filling purposes. The filling connections 87, as in FIG. 19, essentially funnel-shaped, are elongated in one dimension and narrower in the other and provided with an interiorly threaded circular collar 88 at the lower end so as to be capable of being threaded onto a threaded nipple 89 of FIG. 17, which is welded onto the upper end of a square tube 90 which extends through the upper ring 52, of the respective space assembly, and downwardly through a corresponding hole in the protective ring 72 within the space. Square tube 90 is, of course, welded to both ring 72 and ring 52, at the respective hole through which it extends or to which it connects. Normally, the upper end of nipple 89 is closed by a pipe cap, since the filling connections 87 are attached to the nipples after removal of the pipe cap for filling purposes. Also, after the molecular sieve material space is full, the filling connection 87 may be removed and the nipple 89 again closed by a pipe cap. The filling operation can be conducted by removing the top plate 61. For draining the sieve material from the spaces, drain nipples 91 of FIG. 18, which may be smaller in size than the filling nipples 90, such as having a diameter of one half of the width of the space, extend upwardly through the lower ring 56 and connect with a corresponding hole in the protective ring 73, as in FIG. 18. The drain nipples 91 are conveniently located at opposed positions on the underside of the rings 56, in staggered relation and in a position spaced from the filling connections, such as perpendicular to the staggered row of filling connections. The drain nipples 91 are normally closed by pipe caps, which can be removed for draining used molecular sieve material into the lower space 62, and removal of the used material through an opening uncovered by removal of the access cover 78.

Although this invention has been described with particular reference to the regeneration of molecular sieve material used in the removal of water from alcohol, it will be understood that the method and apparatus of this invention may be utilized for the regeneration of similar material used in the removal of other liquid or vapor from other liquids. It will also be understood that other embodiments of this invention may exist and that variations and changes may be made without departing from the spirit and scope of this invention.

What is claimed is:

1. A method of removing water from a normally liquid fluid by a molecular sieve material and regenerating said molecular sieve material, comprising:
   placing said material within a series of first concentric, elongated, cylindrical spaces of limited thickness and separated by a series of second cylindrical spaces interposed between said first cylindrical spaces, with said second cylindrical spaces having a lesser thickness than the first cylindrical spaces;
   passing said normally liquid fluid through said material while preventing any flow of said liquid fluid from said first cylindrical spaces into said second cylindrical spaces, until said molecular sieve material becomes sufficiently saturated with water that its ability to remove water is impaired;
   passing a heated gas through said second cylindrical spaces while preventing any flow of said gas from said second cylindrical spaces to said first cylindrical spaces, in order to regenerate said molecular sieve material after passage of said normally liquid fluid is discontinued; and
   similarly passing a cool gas through said second cylindrical spaces when sufficient water adsorbed by said molecular sieve material has been driven off to resume circulation of said normally liquid fluid through said molecular sieve material, in order to cool said molecular sieve material to a temperature permitting resumption of removal of water from said normally liquid fluid.

2. A method as defined in claim 1, including:
   recirculating said heated gas along an essentially closed path from one end of said second spaces to the opposite end of said second spaces; and
   reheating said heated gas during said recirculation.

3. A method as defined in claim 2, including:
   supplying an oxygen containing gas and a fuel to a burner; igniting said fuel; and
   introducing the products of combustion into said recirculating gas.

4. A method as defined in claim 2, including:
   passing an ambient temperature, cool gas through said second spaces, following heating of said material.

5. A method as defined in claim 4, wherein:
   said cool gas is drawn from the atmosphere and passed through a portion of said closed path to said one end of said second spaces; and
   said cool gas is exhausted to the atmosphere after passage through a portion of said closed path leading from said opposite end of said second spaces.

6. A method as defined in claim 1, including:
   draining normally liquid fluid from said material prior to heating for regeneration; and
   collecting said drained liquid for subsequent passage through said material.

7. A method as defined in claim 6, including:
   condensing gaseous products produced during heating of said material.

8. A method as defined in claim 7, including:
   collecting condensed gaseous products having a water content no less than the water content of said normally liquid fluid for subsequent passage through said material.

9. A method as defined in claim 1, wherein:
   said normally liquid fluid is alcohol having a water content of about five percent; and
   said alcohol is produced from a mash and distillation of the alcoholic product of said mash.

10. A method as defined in claim 9, including:
    draining alcohol from said material prior to heating for regeneration;
    collecting said drained alcohol for subsequent passage through said material;
    condensing alcohol and water vapor driven off said material by heating;
    collecting a first condensed alcohol having a water content of about five percent or less for subsequent passage through said material; and
    separately collecting a second condensed alcohol having a water content between about five percent and the water content of the product of said mash which is distilled; and
    distilling said second alcohol.

* * * * *